United States Patent
McAlvin et al.

(10) Patent No.: US 8,188,166 B2
(45) Date of Patent: May 29, 2012

(54) UNSATURATED POLYESTER RESIN COMPOSITIONS WITH IMPROVED WEATHERABILITY

(75) Inventors: John E. McAlvin, Collierville, TN (US);
Daniel A. Oakley, Collierville, TN (US);
James S. Tedesco, Valparaiso, IN (US);
Thomas J. Folda, Collierville, TN (US);
Paul Taylor Hutson, Lakeland, FL (US);
Kamana Kigweba, Collierville, TN (US); Diana Klein, Cambridge (CA);
Thomas Steinhausler, Collierville, TN (US); David Treadwell, Collierville, TN (US); John Wilson, Red Banks, MS (US); David J. Zwissler, Arlington, TN (US)

(73) Assignee: AOC, LLC, Collierville, TN (US)

( * ) Notice: Subject to any disclaimer, the term of this patent is extended or adjusted under 35 U.S.C. 154(b) by 0 days.

(21) Appl. No.: 11/494,658

(22) Filed: Jul. 27, 2006

(65) Prior Publication Data

US 2007/0032608 A1    Feb. 8, 2007

Related U.S. Application Data

(60) Provisional application No. 60/703,941, filed on Jul. 29, 2005.

(51) Int. Cl.
*C08K 5/3492* (2006.01)
*C08K 5/13* (2006.01)
(52) U.S. Cl. ........................ 523/508; 523/510
(58) Field of Classification Search ................. 523/500, 523/508, 510
See application file for complete search history.

(56) References Cited

U.S. PATENT DOCUMENTS

| | | | | |
|---|---|---|---|---|
| 3,969,311 | A * | 7/1976 | Kubota | 523/500 |
| 4,246,163 | A * | 1/1981 | Makhlouf et al. | 523/514 |
| 4,336,181 | A * | 6/1982 | Iseler et al. | 523/501 |
| 5,309,690 | A | 5/1994 | Symons | |
| 5,787,667 | A | 8/1998 | Sheahan et al. | |
| 6,103,796 | A * | 8/2000 | Staniek et al. | 524/100 |
| 6,207,077 | B1 * | 3/2001 | Burnell-Jones | 252/301.36 |
| 6,476,159 | B1 | 11/2002 | Ishino | |
| 6,492,470 | B2 | 12/2002 | Crump et al. | |
| 6,617,395 | B1 | 9/2003 | Zhao et al. | |
| 6,660,373 | B2 | 12/2003 | Hsu et al. | |
| 6,759,466 | B2 | 7/2004 | Steinhausler et al. | |
| 6,767,950 | B2 | 7/2004 | Steinhausler et al. | |
| 6,828,364 | B2 | 12/2004 | Gugumus | |
| 6,884,841 | B2 | 4/2005 | Nava | |
| 6,913,702 | B2 | 7/2005 | Kurachi et al. | |
| 7,468,409 | B2 * | 12/2008 | Pearson et al. | 524/99 |
| 2004/0028909 | A1 | 2/2004 | Hodgson et al. | |
| 2004/0092697 | A1 | 5/2004 | Kia et al. | |
| 2004/0220340 | A1 | 11/2004 | McAlvin et al. | |
| 2005/0123694 | A1 | 6/2005 | Simmons et al. | |
| 2006/0167127 | A1 * | 7/2006 | Nguyen et al. | 522/81 |

OTHER PUBLICATIONS

Weather Stabilization and Pigmentation of UV-Curable Powder Coatings, Misev et al., Journal of Coatings Technology, vol. 71, No. 891, Apr. 1999, pp. 37-44.

* cited by examiner

*Primary Examiner* — Peter Szekely
(74) *Attorney, Agent, or Firm* — Baker, Donelson, Bearman, Caldwell & Berkowitz, PC

(57) ABSTRACT

Unsaturated polyester resin compositions with improved weathering characteristics are presented. Further, the manufacture of these unsaturated polyester resin compositions and their potential applications are presented.

51 Claims, 2 Drawing Sheets

UNSATURATED POLYESTER RESIN COMPOSITIONS WITH IMPROVED WEATHERABILITY

This application claims the benefit of U.S. Provisional Application Ser. No. 60/703,941, filed Jul. 29, 2005.

TECHNICAL FIELD

The present invention relates to unsaturated polyester resin compositions having improved weatherability. In a more specific aspect, this invention relates to durable unsaturated polyester resin compositions for applications requiring hydrolytic stability and ultraviolet light resistance. Some applications include coatings, panels, engineered stone, and any composite parts intended for use outdoors or in harsh environments. This invention also relates to a process for the manufacture of these unsaturated polyester resin compositions.

BACKGROUND OF THE INVENTION

Thermoset resins, including unsaturated polyesters, are commonly employed in a variety of fabrications, such as casting materials, fiber reinforced materials and gel coats. Many of the composite articles fabricated from thermoset resins are used in environments exposing them to ultraviolet light, solvents or water. Prolonged UV and water exposure of composite articles derived from conventional unsaturated polyester resins often results in degradation of the article, which can be evidenced by blister formation, fiber prominence, loss of color and yellowing.

Many technologies have been disclosed in patents and general literature for improvements in weatherability of composite articles derived from unsaturated polyester resins. Available technologies have either claimed improved UV resistance or improved hydrolytic stability over conventional systems.

Therefore, a need exists for high performance UV and water resistant unsaturated polyester resin compositions which will also meet the U.S. EPA limits for MACT compliance for hazardous air pollutants (HAPs).

SUMMARY OF THE INVENTION

Briefly described, the present invention provides curable, low-HAP unsaturated polyester resin compositions which exhibit improved hydrolytic stability and enhanced UV light resistance as compared to conventional unsaturated polyesters. The resin compositions of this invention may be employed in demanding environments where there is exposure to water and sunlight, such as composite articles used in marine, bathtub/shower, panel, automotive, farm equipment, synthetic stone, engineered stone, gel coat applications and articles intended for outdoor use in general. The present invention also provides a process for the manufacture of these unsaturated polyester resin compositions.

Accordingly, an object of this invention is to provide unsaturated polyester resin compositions.

Another object of this invention is to provide low HAP unsaturated polyester resin compositions.

Another object of this invention is to provide low HAP unsaturated polyester resin compositions having mechanical and physical properties that are equivalent to conventional unsaturated polyesters.

Another object of this invention is to provide low HAP unsaturated polyester resin compositions having improved weathering characteristics as demonstrated by ultraviolet light stability and blister resistance in aqueous environments.

Still another object of this invention is to provide a process for the manufacture of unsaturated polyester resin compositions.

Still another object of this invention is to provide a process for the manufacture of low HAP unsaturated polyester resin compositions having mechanical and physical properties that are equivalent to conventional unsaturated polyesters.

Still another object of this invention is to provide a process for the manufacture of low HAP unsaturated polyester resin compositions having improved weathering characteristics as demonstrated by ultraviolet light stability and blister resistance in aqueous environments.

These and other objects, features and advantages of this invention will become apparent from the following detailed description.

DETAILED DESCRIPTION OF THE INVENTION

Figure 1:
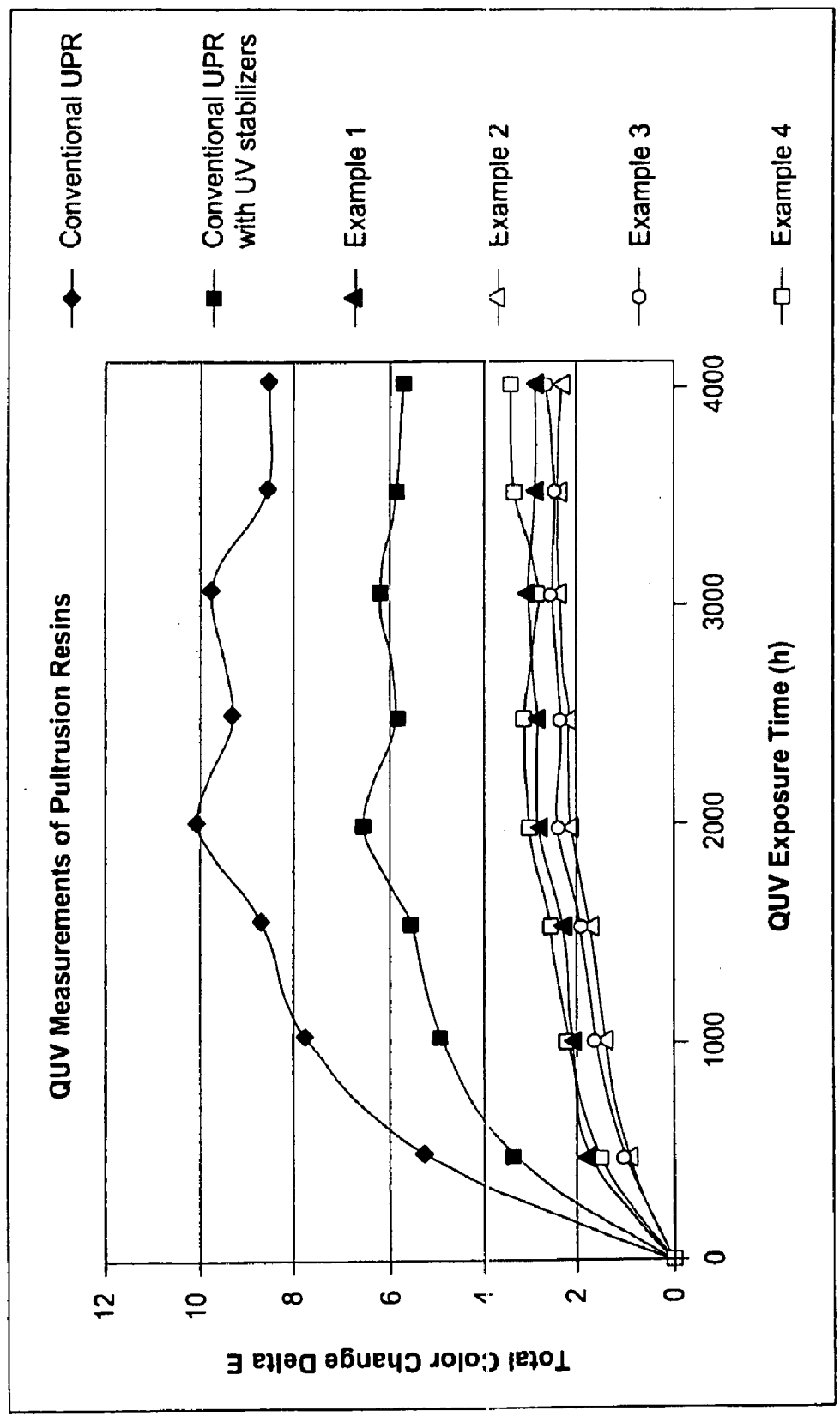
FIG. 1 shows the QUV measurements for resins made according to the invention and for conventional resins.

The present invention provides new and unique low HAP unsaturated polyester resin compositions, one embodiment of which comprises the following five components: (1) an unsaturated polyester comprised of less than 10% by weight aromatic character; (2) a reactive diluent which is styrene, a styrene analogue, an acrylate, or methacrylate or any combination thereof, less than or equal to about 45 percent by weight of the resin composition; (3) a benzophenone; (4) a benzotriazole; and (5) a hindered amine light stabilizer. In another embodiment, the benzophenone and benzotriazole components are replaced with a triazine UV absorber. In addition to the above components, various additives enable the formulation of the curable composition to a gel coat, laminating resin, non-reinforced resin or molding compound. Additionally, more than one of each component can be used in the resin compositions of this invention.

Whenever used in this application the term "(meth)acrylate" will be understood to include both "acrylate" and "methacrylate", and the term "molecular weight" will be understood to mean weight average molecular weight.

Polyester Composition

The procedure for the synthesis of unsaturated polyesters is well known to those skilled in the art. Typically, these polymers are the condensation products of multifunctional carboxylic acids and/or their corresponding anhydrides with multifunctional alcohols. Less common, but still utilized in the polyester industry, are monofunctional carboxylic acids, alcohols and epoxies. In the present invention, the preferred concentration of the first essential component, an unsaturated polyester, is from about 20 to about 70 percent by weight in the curable resin composition.

Suitable unsaturated multifunctional acids or anhydrides used in the synthesis of polyester resins include maleic anhydride, maleic acid, fumaric acid, itaconic acid and related derivatives. These are preferably charged in at least 10 mole percent of the total carboxylic acid and anhydride content.

Saturated multifunctional carboxylic acids or anhydrides that may be used include phthalic acid, isophthalic acid, terephthalic acid, hexahydrophthalic acid, tetrahydrophthalic acid, cyclohexane dicarboxylic acid, adipic acid, succinic acid, malonic acid, nadic acid, trimellitic acid, pyromellitic acid, the related derivatives of such compounds and their corresponding anhydrides. The nadic ester of nadic anhydride is commonly synthesized in situ by reaction of cyclopentadiene with the fumarate and maleate moieties in the polyester backbone. In this application, the term "saturated" refers to compounds that are relatively unreactive towards traditional methods of free radical polymerization. The preferred concentration of the total saturated multifunctional carboxylic acid and anhydride equals about 10 to about 90 mole percent of the total carboxylic acid and anhydride content.

Preferably, saturated multifunctional carboxylic acids or anhydrides that lack carbon-carbon double bonds are used. Examples of these include adipic acid, succinic acid, malonic acid, glutaric acid, oxalic acid, cyclohexane dicarboxylic acid, hexahydrophthalic acid, the related derivatives of such compounds and their corresponding anhydrides. The preferred concentration of these saturated multifunctional carboxylic acids and anhydrides is from about 10 to about 90 mole percent of the total carboxylic acid and anhydride content.

The acids, anhydrides and related derivatives described above may be reacted with any combination of multifunctional alcohols. Examples of suitable multifunctional alcohols used in this process are ethylene glycol, diethylene glycol, triethylene glycol, propylene glycol, dipropylene glycol, tripropylene glycol, neopentyl glycol (NPG), butane diol, butyl ethyl propane diol, trimethyl pentane diol, trimethylol propane, hexane diol, cyclohexane dimethanol, glycerol, pentaerythritol and related derivatives including polyether polyols and other polymeric analogs. The amount of total multifunctional alcohol charged in the preferred unsaturated polyester composition is from about 70 to about 130 mole percent relative to the total carboxylic acid and anhydride content.

Monofunctional acids, alcohols and epoxies can be used in the synthesis of the unsaturated polyester. Some saturated monofunctional carboxylic acids used in polyester synthesis include benzoic acid, 2-ethylhexanoic acid and lauric acid. Examples of monofunctional alcohols that may be used are benzyl alcohol, 2-ethyl hexanol, lauryl alcohol and cyclohexanol. Monofunctional epoxy compounds such as allyl glycidyl ether, glycidyl methacrylate or related derivatives may also be utilized. One or more of these compounds may be used. The preferred concentration of these monofunctional compounds is from about 1 to about 30 percent by weight of the reactor charge in the polyester synthesis.

Polyester Synthesis

The unsaturated polyester in the present invention may be prepared by a single or multi-stage procedure. Suitable reaction temperatures are from about 150 to about 240° C., preferably from about 180 to about 220° C. This procedure may optionally include catalysts for esterification and isomerization. The catalysts for esterification are well known to those skilled in the art and include a variety of acids, transition metal catalysts and tin compounds. These esterification catalysts are preferably used at levels of up to about 1 percent by weight of the polyester synthesis charge. Examples of suitable isomerization catalysts are acids, nitrogen containing compounds, amines and amides. These are typically used at levels of up to about 1 percent by weight of the polyester synthesis charge.

The resulting unsaturated polyester in the present invention has a weight average molecular weight of from about 1000 to about 12000, preferably from about 1500 to about 8000.

Following the synthesis, the unsaturated polyester of the present invention is dissolved in an unsaturated reactive diluent. Styrene and related analogues of styrene may be utilized as a reactive diluent. Some analogues of styrene include vinyl toluene, alpha methyl styrene, divinyl benzene and t-butyl styrene. The concentration of styrene or related analogues of styrene in the unsaturated polyester resin solution can be up to about 45 percent by weight. In a preferred embodiment, the styrene concentration is less than about 30 percent by weight. (Meth)acrylates may also be utilized as a reactive diluent up to about 45 percent by weight. The preferred concentration of (meth)acrylates in the unsaturated polyester resin solution can be up to about 30 percent by weight.

Formulation

Additives may be used in formulating the curable resin composition of the present invention. The additives and their functions are well known in the industry, examples of which are thixotropic additives, pigments, suppressants, air release agents, fillers, adhesion promoters, inhibitors, leveling agents, wetting agents, adhesion promoters, UV absorbers and light stabilizers.

Thixotropic agents that are useful in this invention include fumed silica, organoclays, inorganic clays and precipitated silica. Multifunctional alcohols are commonly used to enhance thixotropic properties. If used, the preferred level of thixotropic agent is up to about 10 percent by weight. The thixotropic enhancer is often used at levels of up to about 2 percent by weight.

Pigments that may be used with this invention may be organic or inorganic, such as titanium dioxide, carbon black, iron oxides, phthalocyanine blue and quinacridone red. These pigments are often dispersed in a vehicle resin, and the level of pigment in this invention may range up to about 40 percent by weight.

Suppressants to reduce emissions and enhance cure time include waxes, polyethers, polysiloxanes and various block copolymers, and these may be used at levels of up to about 5 percent by weight. Air release agents are commonly available and may be used at levels of up to about 1 percent by weight.

The present invention may also contain fillers such as talc, alumina trihydrate, calcium sulfate, calcium carbonate, magnesium sulfate, magnesium carbonate, barium sulfate and the like. These fillers may be present at levels of up to about 40 percent by weight.

Leveling agents such as acrylic resins, fluorocarbons, fluoropolymers and silicones may be added at levels of up to about 2 percent by weight.

Wetting agents may also be used, such as boric acid esters, phosphate esters, fatty acid salts, polyethers and others. These agents may be used at levels of up to about 2 percent by weight.

Adhesion promoters such as silanes may be used in amounts of up to about 2 percent by weight in the formulated resin.

UV stability is improved with the addition of light stabilizers and UV absorbers. Many commercially available light stabilizers are classified as hindered amine light stabilizers (HALS) that oxidize and scavenge radicals. UV absorbers classified as triazines, benzotriazoles, benzophenones, and micronized titanium dioxide, shield the polymer or additives by absorbing UV and dissipating the energy as heat. Combinations of these classes of compounds may be formulated in this invention at levels of up to about 5 percent by weight. Preferably, two or more classes of these compounds of UV absorbers and/or hindered amine light stabilizers are utilized in the resin formulation. It is more preferred the resin composition contains at least one benzotriazole, one benzophenone and one hindered amine light stabilizer.

The resin compositions of this invention may be cured by a number of free-radical initiators, such as organic peroxide and azo-type initiators. Peroxide initiators include diacylperoxides, hydroperoxides, ketone peroxides, peroxyesters, peroxyketals, dialkyl peroxides, alkyl peresters, percarbonates and peroxydicarbonates. Azo-type initiators include azobisisobutyronitrile (AIBN) and related compounds. These initiators are preferably used in the range of from about 0.3 to about 3 percent by weight.

The resin compositions of this invention may optionally be cured by UV or electron beam.

Metal carboxylates, such as cobalt naphthenate or cobalt octoate are often employed to catalyze the free-radical reaction. Zinc, iron, vanadium, manganese, zirconium, calcium and other transition metal compounds are also commonly used for this process. Nitrogen-containing compounds including derivatives of aniline, various amides, quaternary ammonium salts, aromatic and aliphatic amines are also used to promote the free radical reaction. These metal carboxylates and nitrogen-containing compounds and combinations thereof can be added to the resin composition at levels of up to about 5 percent by weight.

Inhibitors such as hydroquinone, parabenzoquinone, toluhydroquinone, 4-tert butylcatechol, butylated hydroxytoluene and related derivatives may be added to increase shelf stability and adjust gel time. Copper naphthenate may also be used for the same function. Such compounds and combinations thereof are added to the resin composition at levels of from about 0.0002 to about 1 percent by weight.

Fire retardance may be introduced by adding phosphorus-containing compounds, hydrated fillers, clays, silicon compounds, halogenated materials or combinations thereof up to about 60 percent by weight. More preferably to maintain acceptable weatherability, phosphorus-containing compounds may be added up to about 40 percent by weight.

The resin compositions of this invention can be formulated and cured with a variety of fillers, additives and initiators commonly used in conventional polyester pultrusion formulations. Fillers such as ATH, clay or calcium carbonate can be used to improve processing and reduce cost. Additives such as pigments, internal lubricants and wetting agents can be part of the final formulation.

Testing

The mechanical properties of the cured products obtained from this invention are comparable to that of conventional unsaturated polyester resins. The resin compositions of this invention may be useful in any application where articles fabricated from these resins are exposed to UV and/or water. Some applications include resins to be used in gel coats, cast polymers, filled and unfilled glass or carbon fiber reinforced laminating resins, compression molding, pultrusion and resin transfer molding.

The present invention is further illustrated by the following examples which are illustrative of certain embodiments designed to teach those of ordinary skill in the art how to practice the invention and to represent the best mode contemplated for practicing the invention.

In the following examples, the term "parts" indicates parts by weight. Several of the examples were evaluated for performance with UV exposure and hydrolytic stability. Resins were also evaluated as ⅛-inch clear cast samples for mechanical properties, which were cured with 1.25% MEKP, followed by a post cure for five hours at 100° C. The results of mechanical testing demonstrate acceptable properties.

Gloss and color retention of several examples formulated as gel coats were evaluated and compared to conventional gel coats in accelerated weather testing using a Q-UV weather-o-meter. Test specimens were constructed by applying a 20-mil thickness cured film of the examples on a glass plate. After thin film cure was achieved, two plies of 1½ ounce fiberglass mat and a commonly available marine-grade polyester resin were used to construct the reinforcing laminate. After cure, the specimens were de-molded with initial color and gloss readings taken. The specimens were exposed in the weather-o-meter using UV-A 340 nm bulbs and UV-B 313 nm bulbs. Gloss and color readings were taken periodically during the exposure period.

The hydrolytic stability of several formulated gel coat examples was evaluated and compared to conventional gel coats by water resistance testing. Test specimens were constructed by applying a 20-mil thickness cured film of the examples on a glass plate. After thin film cure was achieved, two plies of 1½ ounce fiberglass mat and a commonly available marine-grade polyester resin were used to construct the reinforcing laminate. After cure, the specimens were de-molded and exposed to boiling water for a period of 100 hours. The specimens were then rated for resistance to blistering, cracking, fiber prominence, color change and loss of gloss.

Pultrusion test samples for QUV weather testing were constructed by first mixing the formulations in Examples 1-4. While any size shape or thickness can be pultruded with this technology, this example pultruded samples that were 0.050 inches thick by 2.5 inches wide. The samples were fabricated using 48 ends of 250 yield glass roving and two layers of polyester veil. The veil covered the outside of the sample with the majority of the sample substantially comprised of glass roving. The glass roving was wet with the resin formulation by pulling them through a bath containing the resin formulation. Excess resin was squeezed off the glass, and the polyester veil was introduced as the glass entered the die. The resin/glass/veil packaged was pulled through the heated die and cured within the die. Upon exiting the die, the sample was pulled on a continuous basis by the pultruder pullers until the sample reaches an inline saw that cuts samples to length. The samples were tested in QUV weathering equipment with the results given in FIG. 1. The specimens were exposed in the weather-o-meter using UV-A 340 nm bulbs and UV-B 313 nm bulbs. Gloss and color readings were taken periodically during the exposure period.

The invention described herein encompasses the preparation and use of a curable resin. Tinuvin UV stabilizers were obtained from Ciba Specialty Chemicals. Lowilite UV stabilizers were obtained from Great Lakes.

EXAMPLE 1

To a stainless steel reactor was charged 30 parts of neopentyl glycol, 4 parts of propylene glycol, 22 parts of hexahydrophthalic anhydride, 3 parts trimethylol propane, 0.004 parts hydroquinone, 0.25 parts piperidine, 25 parts maleic anhydride and 8 parts 2-ethyl hexanol. The mixture was heated at 210° C. with removal of water until an acid number of 15 was obtained with a weight average molecular weight of 4,500. The molten unsaturated polyester product was delivered to styrene containing 50 ppm predissolved toluhydroquinone. The unsaturated polyester was dissolved in styrene solution with agitation at a concentration of 70 percent resin solids and 30 percent styrene. The base resin was then formulated to pultrusion resin as described in Table 1.

TABLE 1

| Material | Parts |
|---|---|
| Base resin of Example 1 | 98 |
| TINUVIN 400 (Triazine UVA) | 1 |
| TINUVIN 123 (HALS) | 1 |
| INT Pul-24 Lubricant | 1 |
| 70% Titanium dioxide pigment dispersion | 3 |
| Calcium Carbonate | 14 |
| Wilklay SA-1 (Clay filler) | 14 |
| Butylated hydroxyl toluene | 0.05 |

The unsaturated polyester was cured by pultrusion as described above and evaluated by QUV weathering. The invention showed superior results compared to the conventional resin systems (FIG. 1).

EXAMPLE 2

To a stainless steel reactor was charged 30 parts of neopentyl glycol, 4 parts of propylene glycol, 22 parts of hexahydrophthalic anhydride, 3 parts trimethylol propane, 0.004 parts hydroquinone, 0.25 parts piperidine, 25 parts maleic anhydride and 8 parts 2-ethyl hexanol. The mixture was heated at 210° C. with removal of water until an acid number of 15 was obtained with a weight average molecular weight of 4,500. The molten unsaturated polyester product was delivered to styrene containing 50 ppm predissolved toluhydroquinone. The unsaturated polyester was dissolved in styrene solution with agitation at a concentration of 70 percent resin solids and 30 percent styrene. The base resin was then formulated to pultrusion resin as described in Table 2.

TABLE 2

| Material | Parts |
|---|---|
| Base resin of Example 2 | 99 |
| Lowilite 20 (Benzophenone) | 0.4 |
| Lowilite 27 (Benzotriazole) | 0.4 |
| Lowilite 92 (HALS) | 0.6 |
| Pul-24 Lubricant | 1 |
| 70% Titanium Dioxide pigment dispersion | 3 |
| Calcium Carbonate | 14 |
| Wilklay SA-1 (Clay filler) | 14 |
| Butylated hydroxyl toluene | 0.05 |

The unsaturated polyester was cured by pultrusion as described above and evaluated by QUV weathering. The invention showed superior results compared to the conventional resin systems (FIG. 1).

EXAMPLE 3

To a stainless steel reactor was charged 22 parts of neopentyl glycol, 16 parts of propylene glycol, 3 parts trimethylol propane, 12 parts of adipic acid, 0.0025 parts hydroquinone, 0.09 parts piperidine, 37 parts maleic anhydride and 9 parts 2-ethyl hexanol. The mixture was heated at 210° C. with removal of water until an acid number of 15 was obtained with a weight average molecular weight of 8,000. The molten unsaturated polyester product was delivered to styrene containing 30 ppm predissolved toluhydroquinone and 10 ppm 8% copper naphthenate in mineral spirits. The unsaturated polyester was dissolved in styrene solution with agitation at a concentration of 70 percent resin solids and 30 percent styrene. The base resin was then formulated to pultrusion resin as described in Table 3.

TABLE 3

| Material | Parts |
|---|---|
| Base resin of Example 3 | 99 |
| Lowilite 20 (Benzophenone) | 0.4 |
| Lowilite 27 (Benzotriazole) | 0.4 |
| Lowilite 92 (HALS) | 0.6 |
| Pul-24 Lubricant | 1 |
| 70% Titanium Dioxide pigment dispersion | 3 |
| Calcium Carbonate | 14 |
| Wilklay SA-1 (Clay filler) | 14 |
| Butylated hydroxyl toluene | 0.05 |

The unsaturated polyester was cured by pultrusion as described above and evaluated by QUV weathering. The invention showed superior results compared to the conventional resin systems (FIG. 1).

EXAMPLE 4

To a stainless steel reactor was charged 22 parts of neopentyl glycol, 16 parts of propylene glycol, 3 parts trimethylol propane, 12 parts of adipic acid, 0.0025 parts hydroquinone, 0.09 parts piperidine, 37 parts maleic anhydride and 9 parts 2-ethyl hexanol. The mixture was heated at 210° C. with removal of water until an acid number of 15 was obtained with a weight average molecular weight of 8,000. The molten unsaturated polyester product was delivered to styrene containing 30 ppm predissolved toluhydroquinone and 10 ppm 8% copper. naphthenate in mineral spirits. The unsaturated polyester was dissolved in styrene solution with agitation at a concentration of 70 percent resin solids and 30 percent styrene. The base resin was then formulated to pultrusion resin as described in Table 4.

TABLE 4

| Material | Parts |
|---|---|
| Base resin of Example 4 | 98 |
| TINUVIN 400 (Triazine UVA) | 1 |
| TINUVIN 123 (HALS) | 1 |
| Pul-24 Lubricant | 1 |
| 70% Titanium dioxidepigment dispersion | 3 |
| Calcium Carbonate | 14 |
| Wilklay SA-1 (Clay filler) | 14 |
| Butylated hydroxyl toluene | 0.05 |

The unsaturated polyester was cured by pultrusion as described above and evaluated by QUV weathering. The invention showed superior results compared to the conventional resin systems (FIG. 1).

EXAMPLE 5

To a stainless steel reactor was charged 30 parts of neopentyl glycol, 4 parts of propylene glycol, 22 parts of hexahydrophthalic anhydride, 3 parts trimethylol propane, 0.004 parts hydroquinone, 0.25 parts piperidine, 25 parts maleic anhydride and 8 parts 2-ethyl hexanol. The mixture was heated at 210° C. with removal of water until an acid number of 15 was obtained with a weight average molecular weight of 4,500.

The molten unsaturated polyester product was delivered to styrene containing 50 ppm predissolved toluhydroquinone. The unsaturated polyester was dissolved in styrene solution with agitation at a concentration of 70 percent resin solids and 30 percent styrene. The base resin was then formulated to gel coat as described in Table 5.

TABLE 5

| Material | Parts |
|---|---|
| Base resin of Example 5 | 55 |
| Air release agent | 0.3 |
| TINUVIN 123 (HALS) | 0.5 |
| TINUVIN 400 (Triazine UVA) | 1 |
| Titanium Dioxide | 19 |
| Fumed Silica | 1.8 |
| Talc | 3.3 |
| Cobalt Hex-Cem | 0.2 |
| Tertiarybutyl catechol | 0.02 |
| Methyl methacrylate | 10 |
| Thixotropic synergist | 0.25 |
| Styrene | 9 |

Figure 2:
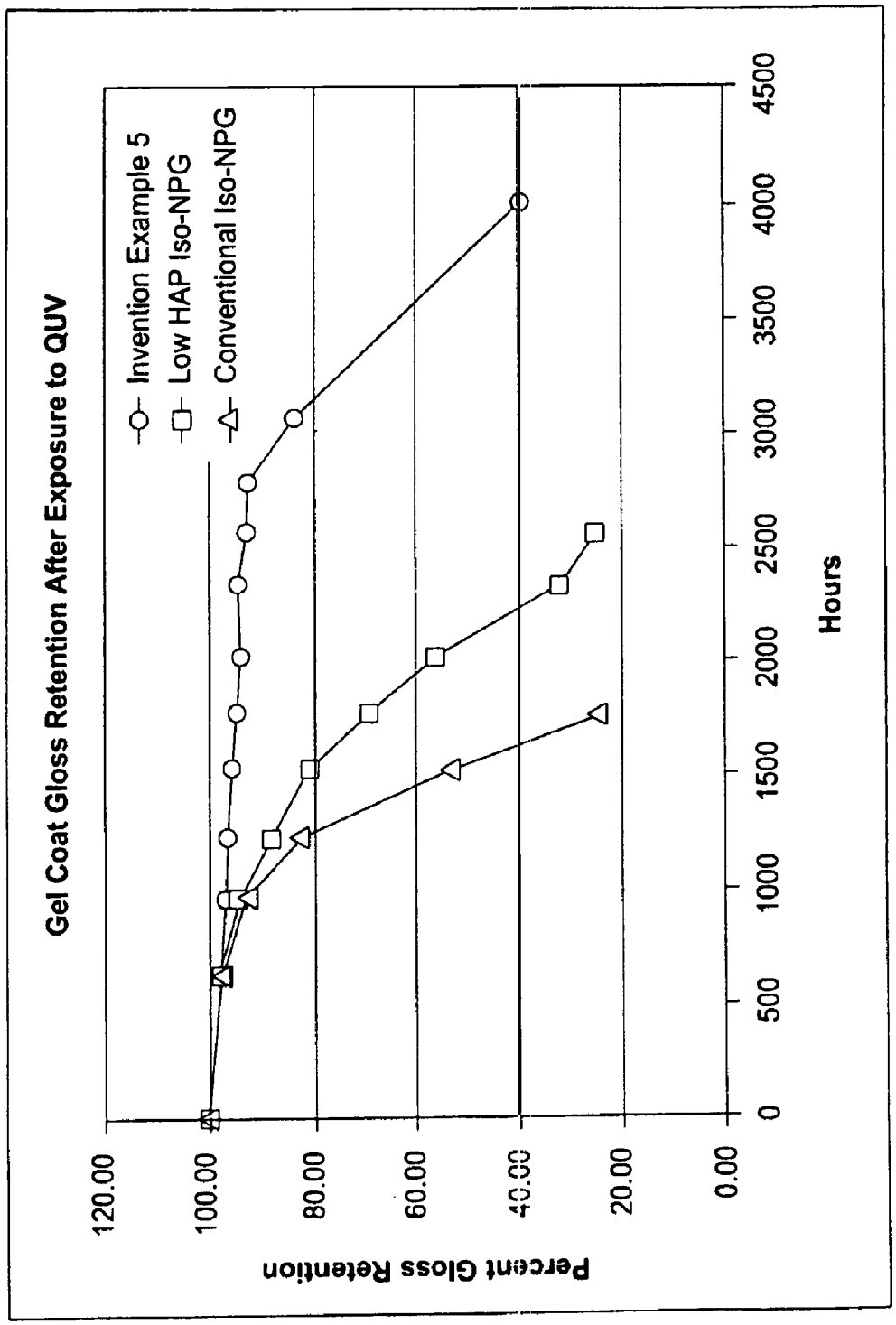
FIG. 2 shows the gloss retention results for gel coats from resins made according to the invention and for gel coats made from conventional resins.

The unsaturated polyester was cured as described above and evaluated by QUV weathering and hydrolytic stability. The invention showed superior results after QUV exposure in gloss retention compared to the conventional resin systems (FIG. 2). The product was also evaluated in hydrolytic stability tests (Table 6).

FIG. 1. QUV weathering analysis (total color change DE*, CIE L*a*b*) of the examples of the invention compared to conventional unsaturated polyester resins and conventional unsaturated polyester resin with UV stabilizers. All samples were cured by pultrusion with a combination of intiators as follows: Percadox 16 (0.55 parts per hundred resin), Trigonox 121-BB-75 (0.4 parts per hundred resin), and Trigonox C (0.3 parts per hundred resin). The conventional unsaturated polyester resin is a DCPD-based polyester with a weight average molecular weight of 7500 without any additives to prevent UV degradation. Also included for comparative purposes is the same conventional DCPD-based unsaturated polyester resin formulated to a UV stabilized resin as in the formulation from Table 1.

FIG. 2. QUV weathering analysis (gloss retention) of invention example 5 compared to conventional isophthalic-NPG based gel coat and a low HAP isophthalic-NPG based gel coat. The conventional isophthalic-NPG ($M_w$=5500) based gel coat was formulated to a gel coat as Example 5 with UV stabilizers (Tinuvin 123 and Tinuvin 400) at concentrations equal to Example 5. The low HAP isophthalic-NPG ($M_w$=4200) based gel coat was also formulated to a gel coat as Example 5 with UV stabilizers (Tinuvin 123 and Tinuvin 400) at concentrations equal to Example 5.

TABLE 6

Comparative hydrolytic stability exposure tests of Gel Coats. The Example 5 gel coat is compared to conventional isophthalic-NPG based gel coat and a low HAP isophthalic-NPG based gel coat. The conventional isophthalic-NPG ($M_w$ = 5500) based gel coat was formulated to a gel coat as Example 5. The low HAP isophthalic-NPG ($M_w$ = 4200) based gel coat was also formulated to a gel coat as Example 5.

| Exposure Hours | Blisters | Color | Fibres | Cracks | Gloss |
|---|---|---|---|---|---|
| Conventional Isophthalic-NPG | | | | | |
| 250 | 0 | 1 | 2 | 0 | 1 |
| 500 | 0 | 2 | 3 | 0 | 1 |
| 750 | 0 | 2 | 3 | 0 | 1 |
| 1000 | 2 | 3 | 3 | 0 | 2 |
| 1250 | 2 | 3 | 3 | 0 | 3 |
| Low HAP Isophthalic-NPG | | | | | |
| 250 | 0 | 1 | 1 | 0 | 1 |
| 500 | 0 | 1 | 2 | 0 | 1 |
| 750 | 0 | 1 | 2 | 0 | 1 |
| 1000 | 0 | 1 | 2.5 | 0 | 1 |
| 1250 | 0 | 1 | 3 | 0 | 2 |
| Example 5 | | | | | |
| 250 | 0 | 1 | 0 | 0 | 1 |
| 500 | 0 | 1 | 1 | 0 | 1 |
| 750 | 0 | 1 | 0 | 0 | 1 |
| 1000 | 0 | 1 | 1 | 0 | 1 |
| 1250 | 0 | 1 | 1 | 0 | 1 |

Ratings: 0 = No Change, 5 = Failure

This invention has been described in detail with particular reference to certain embodiments, but variations and modifications can be made without departing from the spirit and scope of this invention.

What is claimed is:

1. An unsaturated polyester resin composition which comprises:
   A. an unsaturated polyester having a weight average molecular weight from about 1000 to about 12000 and comprised of no aromatic character, wherein the unsaturated polyester is partially derived from one or more aliphatic anhydrides or aliphatic difunctional carboxylic acids;
   B. up to about 45 percent by weight of a reactive diluent which is styrene, vinyl toluene, alpha-methyl styrene, tertiary-butyl styrene, divinyl benzene, an acrylate, methacrylate or a mixture thereof;
   C. a benzophenone;
   D. a benzotriazole; and
   E. a hindered amine light stabilizer.

2. A composition as defined by claim 1 wherein the unsaturated polyester has a weight average molecular weight from about 1500 to about 8000.

3. A composition as defined by claim 1 wherein the unsaturated polyester is partially derived from a monofunctional acid, monofunctional alcohol or monofunctional epoxy.

4. An unsaturated polyester as defined by claim 3 wherein the unsaturated polyester is partially derived from 2-ethyl hexanol, 2-ethyl hexanoic acid, benzyl alcohol, benzoic acid, allyl glycidyl ether, glycidyl methacrylate or a mixture thereof.

5. An unsaturated polyester as defined by claim 3 wherein the unsaturated polyester is partially derived from 2-ethyl hexanol, 2-ethyl hexanoic acid, benzyl alcohol, benzoic acid, allyl glycidyl ether, glycidyl methacrylate or a mixture thereof, as a total of from about 1 to about 30 percent by weight of the reactor charge in the polyester synthesis.

6. A resin composition as defined by claim 1 wherein the resin composition contains a filler.

7. A resin composition as defined by claim 6 wherein the filler is alumina trihydrate, calcium carbonate, clay, silica or a mixture thereof.

8. A resin composition as defined by claim 1 wherein the resin composition contains a reinforcing agent.

9. A resin composition as defined by claim 1 wherein the resin composition contains a pigment.

10. A resin composition as defined by claim 1 wherein the resin composition contains micronized titanium dioxide.

11. A resin composition as defined by claim 1 wherein the resin composition contains a methacrylate or an acrylate in an amount up to about 45 percent by weight.

12. A resin composition as defined by claim 1 wherein the unsaturated polyester is present in an amount from about 20 to about 70 percent by weight.

13. A resin composition as defined by claim 1 wherein the unsaturated polyester has an acid number of less than 50.

14. A resin composition as defined by claim 1 wherein the resin composition contains up to about 10 percent by weight of a thixotropic agent.

15. A resin composition as defined by claim 1 wherein the resin composition contains up to about 40 percent by weight of a pigment.

16. A resin composition as defined by claim 1 wherein components C, D and E comprise up to about 5 percent by weight of the resin composition.

17. A composition as defined by claim 1 wherein the resin composition is cured by a free-radical initiator.

18. A composition as defined by claim 1 wherein the resin composition is cured by a free-radical initiator and a metal carboxylate.

19. A composition as defined by claim 1 wherein the resin composition is cured by a free-radical initiator, a metal carboxylate and a nitrogen-containing compound.

20. A composition as defined by claim 1 wherein the unsaturated polyester is partially derived from hexahydrophthalic anhydride, adipic acid, cyclohexane dicarboxylic acid, succinic anhydride, succinic acid, hexahydrophthalic acid or a mixture thereof.

21. A resin composition as defined by claim 1 wherein the styrene concentration is less than about 35 percent by weight.

22. A process for the manufacture of a styrene-free, unsaturated polyester resin composition, wherein the process comprises mixing:
A. an unsaturated polyester having a weight average molecular weight from about 1000 to about 12000 and comprised of no aromatic character, wherein the unsaturated polyester is partially derived from one or more aliphatic anhydrides or aliphatic difunctional carboxylic acids;
B. up to about 45 percent by weight of a reactive diluent or combination of reactive diluents which are polymerizable by a free-radical initiator;
C. a benzophenone;
D. a benzotriazole; and
E. a hindered amine light stabilizer.

23. An unsaturated polyester resin composition which comprises:
A. an unsaturated polyester having a weight average molecular weight from about 1000 to about 12000 and comprised of no aromatic character, wherein the unsaturated polyester is partially derived from one or more aliphatic anhydrides or aliphatic difunctional carboxylic acids;
B. up to about 45 percent by weight of a reactive diluent which is styrene, vinyl toluene, alpha-methyl styrene, tertiary-butyl styrene, divinyl benzene, an acrylate, methacrylate or a mixture thereof;
C. a triazine; and
D. a hindered amine light stabilizer.

24. A composition as defined by claim 23 wherein the unsaturated polyester has a weight average molecular weight from about 1500 to about 8000.

25. A composition as defined by claim 23 wherein the unsaturated polyester is partially derived from a monofunctional acid, monofunctional alcohol or monofunctional epoxy.

26. An unsaturated polyester as defined by claim 25 wherein the unsaturated polyester is partially derived from 2-ethyl hexanol, 2-ethyl hexanoic acid, benzyl alcohol, benzoic acid, allyl glycidyl ether, glycidyl methacrylate or a mixture thereof.

27. An unsaturated polyester as defined by claim 25 wherein the unsaturated polyester is partially derived from 2-ethyl hexanol, 2-ethyl hexanoic acid, benzyl alcohol, benzoic acid, allyl glycidyl ether, glycidyl methacrylate or a mixture thereof, as a total of from about 1 to about 30 percent by weight of the reactor charge in the polyester synthesis.

28. A resin composition as defined by claim 23 wherein the resin composition contains a filler.

29. A resin composition as defined by claim 28 wherein the filler is aluminua trihydrate, calcium carbonate, clay, silica or a mixture thereof.

30. A resin composition as defined by claim 23 wherein the resin composition contains a reinforcing agent.

31. A resin composition as defined by claim 23 wherein the resin composition contains a pigment.

32. A resin composition as defined by claim 23 wherein the resin composition contains micronized titanium dioxide.

33. A resin composition as defined by claim 23 wherein the unsaturated polyester is present in an amount from about 20 to about 70 percent by weight.

34. A resin composition as defined by claim 23 wherein the unsaturated polyester has an acid number of less than 50.

35. A resin composition as defined by claim 23 wherein the resin composition contains up to about 10 percent by weight of a thixotropic agent.

36. A resin composition as defined by claim 23 wherein the resin composition contains up to about 40 percent by weight of a pigment.

37. A resin composition as defined by claim 23 wherein components C and D comprise up to about 5 percent by weight of the resin composition.

38. A composition as defined by claim 23 wherein the resin composition is cured by a free-radical initiator.

39. A composition as defined by claim 23 wherein the resin composition is cured by a free-radical initiator and a metal carboxylate.

40. A composition as defined by claim 23 wherein the resin composition is cured by a free-radical initiator, a metal carboxylate and a nitrogen-containing compound.

41. A composition as defined by claim 23 wherein the unsaturated polyester is partially derived from hexahydrophthalic anhydride, adipic acid, cyclohexane dicarboxylic acid, succinic anhydride, succinic acid, hexahydrophthalic acid or a mixture thereof 42. A resin composition as defined by claim 23 wherein the styrene concentration is less than about 35 percent by weight.

43. A process for the manufacture of a styrene-free, unsaturated polyester resin composition, wherein the process comprises mixing:

A. an unsaturated polyester having a weight average molecular weight from about 1000 to about 12000 and comprised of no aromatic character;

B. up to about 45 percent by weight of a reactive diluent or combination of reactive diluents which are polymerizable by a free-radical initiator;

C. a triazine; and

D. a hindered amine light stabilizer.

44. An article manufactured from a composition as defined by claim 1.

45. An article manufactured from a composition as defined by claim 23.

46. A gel coat derived from a composition as defined by claim 1.

47. A gel coat derived from a composition as defined by claim 23.

48. A composite panel manufactured from a composition as defined by claim 1.

49. A composite panel manufactured from a composition as defined by 23.

50. Synthetic and engineered stone manufactured from a composition as defined by claim 1.

51. Synthetic and engineered stone manufactured from a composition as defined by claim 23.

* * * * *